United States Patent
Raveh et al.

(10) Patent No.: US 11,640,559 B2
(45) Date of Patent: May 2, 2023

(54) ACCURACY OF CLASSIFICATION MODELS

(71) Applicant: Orbotech Ltd., Yavne (IL)

(72) Inventors: Gonen Raveh, Moshav Timorim (IL); Elad Goshen, Beer Sheva (IL)

(73) Assignee: Orbotech Ltd., Yavne (IL)

( * ) Notice: Subject to any disclaimer, the term of this patent is extended or adjusted under 35 U.S.C. 154(b) by 206 days.

(21) Appl. No.: 17/107,851

(22) Filed: Nov. 30, 2020

(65) Prior Publication Data

US 2021/0174148 A1    Jun. 10, 2021

Related U.S. Application Data

(60) Provisional application No. 62/943,812, filed on Dec. 5, 2019.

(51) Int. Cl.
*G06K 9/62* (2022.01)
*G06N 3/08* (2006.01)

(52) U.S. Cl.
CPC ......... *G06K 9/6262* (2013.01); *G06K 9/6256* (2013.01); *G06K 9/6267* (2013.01); *G06N 3/08* (2013.01)

(58) Field of Classification Search
CPC ... G06K 9/6262; G06K 9/6256; G06K 9/6267
See application file for complete search history.

(56) References Cited

U.S. PATENT DOCUMENTS

| | | | |
|---|---|---|---|
| 10,713,589 B1 * | 7/2020 | Zarandioon | G06N 20/20 |
| 10,719,301 B1 * | 7/2020 | Dasgupta | G06K 9/6267 |
| 11,100,420 B2 * | 8/2021 | Dirac | G06N 20/00 |
| 2015/0379428 A1 | 12/2015 | Dirac et al. | |
| 2019/0370219 A1 | 12/2019 | Efstathiou et al. | |
| 2020/0293570 A1 * | 9/2020 | Miura | G06K 9/6256 |
| 2021/0034819 A1 * | 2/2021 | Wang | G06N 20/00 |

OTHER PUBLICATIONS

Bashiri M. et al, "Tuning the parameters of an artificial neural network using central composite design and genetic algorithm", Scientia Iranica, vol. 18, Issue 16, pp. 1600-1608, Dec. 2011.
ISA/IL, ISR and WO for International Application No. PCT/IL2020/051157, dated Dec. 21, 2020.

* cited by examiner

*Primary Examiner* — Utpal D Shah
(74) *Attorney, Agent, or Firm* — Hodgson Russ LLP

(57) ABSTRACT

An Artificial Intelligence system, an apparatus and, a computer program product and a method for automatic improvement of artificial intelligence classification models. A model-performance measurement of the classification model is iteratively improved by at least a predetermined target goal in each iteration. The iterative improvement comprises generating a hypotheses graph for improving the classification model, based on a list of hypotheses and scores thereof. Each hypothesis relates to a strategy for potentially improving the classification model, and is associated with a score indicating a likelihood that an application thereof improves the model-performance measurement. Each node of the hypotheses graph comprises a hypothesis of the list of hypotheses. The iterative improvement further comprises selecting a selected hypothesis from the hypotheses graph based on a traversal thereof; and executing the selected hypothesis thereby updating the classification model and improving the model-performance measurement by at least the predetermined target goal.

18 Claims, 7 Drawing Sheets

ACCURACY OF CLASSIFICATION MODELS

CROSS-REFERENCE TO RELATED APPLICATIONS

This application claims priority to the provisional patent application filed Dec. 5, 2019 and assigned U.S. App. No. 62/943,812, the disclosure of which is hereby incorporated by reference.

TECHNICAL FIELD

The present disclosure relates to artificial intelligence in general, and to automatic improvement of artificial intelligence classification models, in particular.

BACKGROUND

Artificial Intelligence (AI) is a fundamental tool for many tasks in different computational systems. AI simulates human intelligence processes by machines, computer systems, learning algorithms, or the like. The intelligence processes may comprise learning the acquisition of information and rules for using the information, reasoning using rules to reach approximate or definite conclusions and self-correction. Particular applications of AI comprise expert systems, speech recognition, machine vision, autonomous driving, intelligent routing in content delivery networks, military simulations, and the like.

The use of AI has become very popular in inspection systems, in particular systems aimed for identification and classification of items or defects in items, products, and the like. AI techniques have become an essential part of the technology industry, helping to solve many challenging problems in the manufacturing process.

BRIEF SUMMARY

One exemplary embodiment of the disclosed subject matter is a method comprising: obtaining an instruction to improve a classification model, wherein the classification model is utilized for a supervised image classification task; in response to said obtaining, iteratively improving a model-performance measurement of the classification model, wherein in each iteration the model-performance measurement of the classification model is improved by at least a predetermined target goal, wherein said iteratively improving comprises: determining a list of hypotheses, wherein each hypothesis of the list of hypotheses relates to a strategy to potentially improve the classification model, wherein for each hypothesis a score is determined, wherein the score of a hypothesis indicates a likelihood that an application of the hypothesis improves the model-performance measurement of the classification model; generating, based on the list of hypotheses and scores thereof, a hypotheses graph for improving the classification model, wherein each node of the hypotheses graph comprises a hypothesis of the list of hypotheses; selecting a selected hypothesis from the hypotheses graph, wherein said selecting is based on a traversal of the hypotheses graph; and executing the selected hypothesis, whereby updating the classification model and improving the model-performance measurement by at least the predetermined target goal.

Another exemplary embodiment of the disclosed subject matter is an AI system comprising: a classification model improvement module configured to obtain an instruction to improve a classification model. The classification model is utilized for a supervised image classification task. The classification model improvement module is configured to iteratively improve a model-performance measurement of the classification model. In each iteration the model-performance measurement of the classification model is improved by at least a predetermined target goal. The classification model improvement module comprises a planning module configured to: determine a list of hypotheses, wherein each hypothesis of the list of hypotheses relates to a strategy to potentially improve the classification model, wherein for each hypothesis a score is determined, wherein the score of a hypothesis indicates a likelihood that an application of the hypothesis improves the model-performance measurement of the classification model; generate, based on the list of hypotheses and scores thereof, a hypotheses graph for improving the classification model, wherein each node of the hypotheses graph comprises a hypothesis of the list of hypotheses; select a selected hypothesis from the hypotheses graph, wherein said selecting is based on a traversal of the hypotheses graph. The classification model improvement module further comprises an execution module configured to execute the selected hypothesis, update the classification model and improve the model-performance measurement by at least the predetermined target goal.

Yet another exemplary embodiment of the disclosed subject matter is a computerized apparatus having a processor, the processor being adapted to perform the steps of: obtaining an instruction to improve a classification model, wherein the classification model is utilized for a supervised image classification task; in response to said obtaining, iteratively improving a model-performance measurement of the classification model, wherein in each iteration the model-performance measurement of the classification model is improved by at least a predetermined target goal, wherein said iteratively improving comprises: determining a list of hypotheses, wherein each hypothesis of the list of hypotheses relates to a strategy to potentially improve the classification model, wherein for each hypothesis a score is determined, wherein the score of a hypothesis indicates a likelihood that an application of the hypothesis improves the model-performance measurement of the classification model; generating, based on the list of hypotheses and scores thereof, a hypotheses graph for improving the classification model, wherein each node of the hypotheses graph comprises a hypothesis of the list of hypotheses; selecting a selected hypothesis from the hypotheses graph, wherein said selecting is based on a traversal of the hypotheses graph; and executing the selected hypothesis, whereby updating the classification model and improving the model-performance measurement by at least the predetermined target goal.

Yet another exemplary embodiment of the disclosed subject matter is a computer program product comprising a non-transitory computer readable storage medium retaining program instructions, which program instructions when read by a processor, cause the processor to perform a method comprising: obtaining an instruction to improve a classification model, wherein the classification model is utilized for a supervised image classification task; in response to said obtaining, iteratively improving a model-performance measurement of the classification model, wherein in each iteration the model-performance measurement of the classification model is improved by at least a predetermined target goal, wherein said iteratively improving comprises: determining a list of hypotheses, wherein each hypothesis of the list of hypotheses relates to a strategy to potentially improve the classification model, wherein for each hypothesis a score is determined, wherein the score of a hypothesis indicates a likelihood that an application of the hypothesis improves the model-performance measurement of the classification model; generating, based on the list of hypotheses and scores thereof, a hypotheses graph for improving the classification model, wherein each node of the hypotheses graph comprises a hypothesis of the list of hypotheses; selecting a selected hypothesis from the hypotheses graph, wherein said selecting is based on a traversal of the hypotheses graph; and executing the selected hypothesis, whereby updating the classification model and improving the model-performance measurement by at least the predetermined target goal.

DESCRIPTION OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
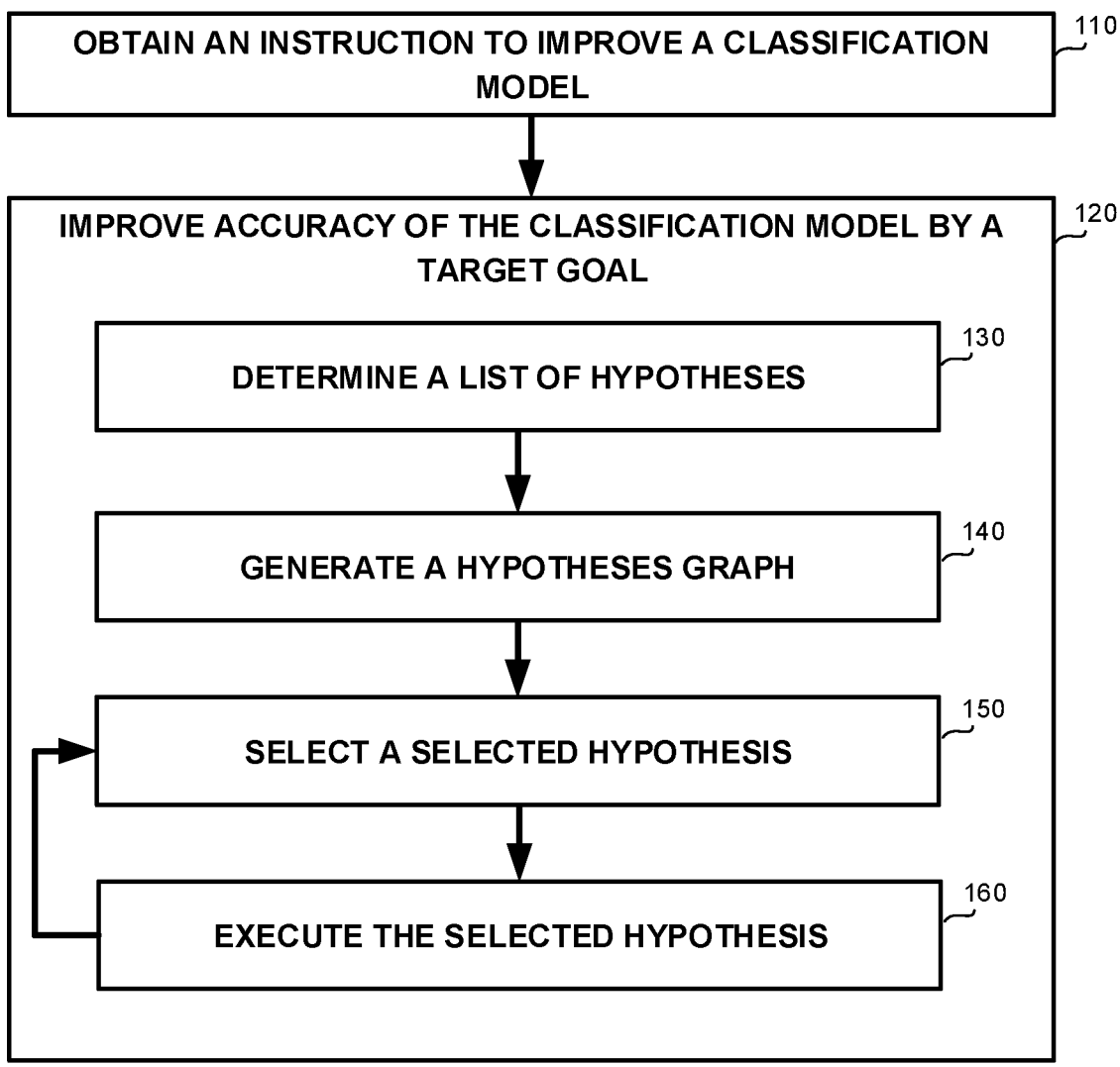
FIG. 1 shows a flowchart diagram of a method, in accordance with some exemplary embodiments of the disclosed subject matter.

One technical problem dealt with by the disclosed subject matter is to enable AI-based software to autonomously behave and act in a detached environment from a developer thereof. In some exemplary embodiments, the AI-based software may be configured to monitor a production process or a product of manufacturing machine, such as in a factory, in a production plant, or the like. The AI-based software may be configured to determine, such as based on visual input, if the machine functions properly. The AI-based software may be configured to utilize a classification model to classify products image, classify items within the images, identify defects within items or products, or the like.

As an example, AI-based software may be used for Automated Optical Inspection (AOI), such as in Flat Panel Displays (FPD) manufacture, Printed Circuit Board (PCB) manufacture, or the like. The AOI may be performed using AI-based software, but without providing full information to the developer of the AI-based software. In some exemplary embodiments, the same developer may provide the AI-based software to different competing manufacturers, and they may wish to limit the information they disclose to their shared vendor to limit potential exposure.

In some exemplary embodiments, the AI-based software may operate in a detached environment, such as in a customers' factory, without the ability to send or share information with other AI software, the developer of the AI-based software, research and development center of the AI-based software, or the like. Additionally or alternatively, the AI-based software may operate in a connected environment, but may be subject to restrictions over volume of data to transfer and share with third parties, including the developer of the AI-based software.

Another technical problem dealt with by the disclosed subject matter is to automatically enhance the accuracy of AI-based software, without relying on data scientists and human experts. In some exemplary embodiments, AI-based software may be used for supervised image classification in various systems. A user may control the AI-based software. The AI-based software may be configured to collect images. Each image may be labeled, such as by human users, for training. Experts may provide hyper-parameters for the model utilized by the AI-based software, manually remove irrelevant features from input data, inspect errors, perform feature engineering, or the like. While AI-based software presents a range of new functionalities, AI-based software may be limited by the quality of the data provided thereto in training, and to the specific configurations of the model used thereby.

One technical solution is to perform a self-motivated learning that iteratively improves an accuracy of the classification model. In some exemplary embodiments, the self-motivated learning may be performed automatically, occasionally, periodically, such as every predetermined timeframe, or the like. Additionally or alternatively, the self-motivated learning may be initiated by an instruction from a human user, from the AI-based software, from a server associated with the AI-based software, or the like. It may however be appreciated that the self-motivated learning may be performed automatically and may be guided without the involvement of data scientists and human experts. In some exemplary embodiments, the AI-based software may utilize pre-defined interfaces and provide the machine learning and AI mechanism for training models, improving models, tracking performance of models, or the like. In some exemplary embodiments, the AI-based software may automatically interact with user application via two-way callbacks, enabling the AI-based software to invoke requests for and receive additional training data, improved information, or the like. In some exemplary embodiments, improving the accuracy of the classification model may be measured by improving an accuracy measurement or any other model performance metric of the classification model, such as an F-score (e.g., F1 score), an accuracy score, a precision score, a recall score, confusion matrix, area-under-curve, Receiver Operating Characteristics (ROC), accuracy differences between training set and validation set, time of GPU and CPU resources, computer memory needed for prediction, or the like. In some exemplary embodiments, a predetermined target goal for improving the accuracy of the classification model may be set automatically based on the classification task, may be set manually be a user, such as by the operator of the AI software, or the like. As an example, the predetermined target goal may be a 0.5% improvement, e.g., improving an accuracy measurement of the classification model by at least 0.5% in each iteration of the learning. As another example, the predetermined target goal may be about 0.1%, 0.2%, 1%, or the like.

In some exemplary embodiments, a list of hypotheses for improving the classification model may be determined in each iteration. Each hypothesis may relate to a strategy to potentially improve the classification model. As an example, the hypothesis may relate to a choice of algorithm, such as which neural network to be used by the classification model, or the configuration of the algorithm, such as the neural network topology (e.g., number of layers, size of layers, connectivity between layers), hyper-parameters, combination between several algorithmic concepts, or the like. In some exemplary embodiments, a score may be determined for each hypothesis. The score may indicate a likelihood that an application of the hypothesis improves the accuracy measurement of the classification model. In some exemplary embodiments, the score may be determined using a prediction model that implements machine learning techniques. The prediction model may implement supervised learning techniques and improve over time in view of actual observed results. Additionally or alternatively, each hypothesis may be associated with a cost function that indicates the cost of applying the hypothesis on the classification model, such as the time required for applying the hypothesis, the computational resources required for applying the hypothesis, additional resources required for applying the hypothesis (e.g., additional manual labeling for an additional training set), or the like.

In some exemplary embodiments, a hypotheses graph for improving the classification model may be generated based on the list of hypotheses and scores thereof. Each node of the hypotheses graph may comprise a hypothesis of the list of hypotheses. The hypotheses graph may be ordered based on the scores of the hypotheses, imposing a traversal order thereof. As an example, the graph may be ordered so that hypotheses with higher scores may be traversed first. A selected hypothesis may be selected from the hypotheses graph, based on a traversal thereof. The selected hypothesis may be executed to update the classification model and improve the accuracy measurement thereof by at least the predetermined target goal. In some exemplary embodiments, several hypotheses may be executed in parallel and best candidate may be selected therefrom. The parallel execution may be performed using a same Graphical Processing Unit (GPU), a Central Processing Unit (CPU), a distributed execution environment, or the like.

In some exemplary embodiments, capabilities of the disclosed solution may be embedded into the internal algorithmic process of manufacturing a product and Quality Assurance (QA) thereof. As an example, an AOI classification decision sub-system may be configured to detect and categorize defects using the automatically generated classification models. In some exemplary embodiments, defect detection may be performed early in the manufacturing process, instead of inspecting for defects at the end of the scanning process, such as by generating and validating defect predictions. In some exemplary embodiments, the AOI classification decision sub-system may operate and detect defects without providing images, videos, raw data, or the like, to an external party.

As another example, the disclosed solution may be utilized in AOI during FPD manufacture. The FPD industry develops intensively and involves rapid and classified innovations that may be important not to be exposed. The disclosed solution may be employed in different stages in the FPD manufacture, such as in inspection, metrology, yield management solutions, test and repair solutions, or the like. The disclosed subject matter enables FPD manufacturers to detect critical defects, while locating sources of errors both in the ramp-up phase and during production, and analyze data from the production line in order to quickly diagnose and repair process-related defects. Additionally or alternatively, the disclosed solution may be utilized in AOI of PCBs, touch sensors, or other electronic devices during their manufacturing process, in automatic repair systems of such devices, in direct imaging systems for such devices, or the like.

In some exemplary embodiments, the disclosed subject matter may implement reinforcement learning regarding the hypotheses execution to improve the self-motivated learning. In some exemplary embodiments, reinforcement learning may be performed to provide for a balance between exploration of hypotheses and exploitation of hypotheses that had proven to be useful in the past. In some exemplary embodiments, the learning task may be classified and a reinforcement learning may be utilized to determine which hypotheses to be applied, an order of application between hypotheses, or the like. In some exemplary embodiments, the disclosed subject matter may implement reinforcement learning to predict a useful hypotheses graph based on a sequence of previously generated hypotheses graphs of the same learning task, based on the classification of the learning task, based on predicted scores of the different hypotheses, or the like.

In some exemplary embodiments, the hypotheses to be used by the disclosed subject matter may include several different categories. In some exemplary embodiments, a hypotheses generator may be utilized to generate a hypothesis for a given model. Different hypotheses generators may be provided. In some exemplary embodiments, some hypotheses generators may be "best practice" generators, configured to generate hypotheses that are considered to be useful as a rule of thumb. Additionally or alternatively, some hypotheses generators may be manually programmed by Subject Matter Experts (SMEs), such as experts that have intimate knowledge of the manufacture process and machines used therein. The SME may program scripts that identify properties of the learning task and generate, in an automated manner, hypotheses that could improve the performance of the trained model. It is noted that the SME hypotheses generators may be manually programmed, but may be invoked automatically and may not require the involvement of the SME herself in the self-motivated learning process. Additionally or alternatively, some hypotheses generators may be random hypotheses generators configured to provide random hypotheses, so as to enable exploration of potentially unappealing hypotheses.

One technical effect of utilizing the disclosed subject matter is providing an autonomous solution for self-motivated learning, disconnected from external computing and databases. The disclosed subject matter enables inferencing, data-cleansing, novelty-detection, and the like, without requiring additional data or exposing internal data. The disclosed solution utilizes the experience and the access to all relevant data that the developer of the AI machine, without exposing data of the factory or the production plant utilizing the AI machine, to the developer or to any other external party. Another technical effect of utilizing the disclosed subject matter is reducing the Time To Market (TTM) required from a product being conceived until its being available for sale. TTM is important in industries where products are outmoded quickly, especially in the world of micro-electronics, such as in FPD, PCB, or the like. The disclosed subject matter improves the robustness and stability of AI-based software, and enables automatic model performance tracking.

Yet another technical effect of utilizing the disclosed subject matter is gradual improvement of a model, in an iterative manner. By setting incremental, yet relatively small goals to be achieved, the disclosed subject matter may employ different hypotheses in different combinations and orders to provide an improved model. In some cases, many small gradual improvements may be feasible using limited resources, while attempting to achieve a large improvement (that may be the accumulation of the small gradual improvements) may be hard or even unfeasible.

The disclosed subject matter may provide for one or more technical improvements over any pre-existing technique and any technique that has previously become routine or conventional in the art. Additional technical problem, solution and effects may be apparent to a person of ordinary skill in the art in view of the present disclosure.

Referring now to FIG. 1 showing a flowchart diagram of a method, in accordance with some exemplary embodiments of the disclosed subject matter.

On Step 110, an instruction to improve a classification model may be obtained. In some exemplary embodiments, the classification model may be utilized for a supervised image classification task, such as for AOI classification, In-Process-Quality-Control (IPCQ) tasks, QI task, or the like. In some exemplary embodiments, the supervised image classification task may be a phase in an AI-based inspection software aimed for identification and classification of items or defects in items, products, or the like. The AI-based inspection software may be configured to define the AI interfaces, provides the machine learning and AI mechanism for training classification models, improving classification models, tracking, automatically interacting with a user application via two-way callbacks, or the like. The instruction may be obtained from a system utilizing the AI-based inspection software, a server related to, and not from an external application. The instruction may be provided as a self-motivated improving step of the AI-based inspection software.

On Step 120, a model-performance measurement of the classification model, such as but not limited to accuracy measurement may be improved by at least a predetermined target goal. In some exemplary embodiments, the predetermined target goal may be a default target goal for improving model-performance measurements. Additionally or alternatively, the predetermined target goal may be predetermined by the AI inspection system or a user thereof, based on properties of the supervised image classification task, based on properties of the products being classified, based on properties of the manufacturing process of the products, or the like. Additionally or alternatively, the predetermined target goal may be determined based on the target model-performance measurement that the classification model is requested to achieve.

In some exemplary embodiments, Step 120 may be performed iteratively, such as a predetermined number of iteration, until a general target goal for improving the classification model is achieved, until no improvement is achieved, or the like. Additionally or alternatively, when the target goal is not reached in several successive iterations (such as above a predetermined number of iterations), it may be determined that no additional iteration should be performed as there may be low likelihood that an additional iteration would provide an improvement. Each iteration of Step 120 may comprise Steps 130-160.

On Step 130, a list of hypotheses may be determined. In some exemplary embodiments, each hypothesis of the list of hypotheses may relate to a strategy to potentially improve the classification model. The strategy may relate to a modification of a model type of the classification model, a training parameter of the classification model, a modeling parameter of the classification model, a modeling of the supervised image classification task, a training set utilized to train the classification model, a validation set utilized to validate the classification model, a test set utilized to test the classification model, or the like.

As an example, a hypothesis may be related to the type of learning algorithm of the classification model, such as supervised learning, unsupervised learning, reinforcement learning, self-learning, feature learning, sparse dictionary learning, anomaly detection, association rules, or the like. In some cases, the hypotheses list may comprise at least one hypothesis that is not related to the model type of the classification model, such as a hypothesis related to training parameters of the classification model, a hypothesis related to parameters of the classification task, or the like.

In some exemplary embodiments, the list of hypotheses or a portion thereof may be related to the supervised image classification task. Such hypotheses may be related to the number of classes of the supervised image classification task, the number of images in each class of the supervised image classification task, the image size in the supervised image classification task, a noisy dataset-element label estimation measurement of the supervised image classification task, or the like.

Additionally or alternatively, the list of hypotheses may comprise three types of hypotheses: best practice hypotheses, Reinforcement Learning-based hypotheses, and SME hypotheses. A best practice hypothesis may be a hypothesis that is approved to be generally efficient in improving a classification model. A Reinforcement Learning-based hypothesis may be a hypothesis selected randomly for additional exploration or by exploitation of re-past Reinforcement Learning-based hypothesis. An SME hypothesis may be related to an SME of the supervised image classification task, such as a hypothesis that is known to be efficient in improving classification models of the specific supervised image classification task. The SME hypothesis may be programmed by a human, may be automatically obtained by the AI inspection system, or the like.

In some exemplary embodiments, a score may be determined for each hypothesis. The score of a hypothesis may indicate a likelihood that an application of the hypothesis improves the model-performance measurement of the classification model. The score may be determined based on previous learning or training, may be predicted based on the hypothesis parameters, or the like. Additionally or alternatively, the score may be externally set by a generator of the hypothesis, may be obtained from a database of hypothesis, or the like.

In some exemplary embodiments, determining the list of hypotheses may be performed by applying a reinforcement learning algorithm that utilizes a previous set of hypotheses associated with the supervised classification task. The reinforcement learning algorithm may be configured to improve the selection of hypotheses to the list of hypotheses, based on the previous set of hypotheses and evaluated scores thereof.

On Step 140, a hypotheses graph for improving the classification model may be generated. In some exemplary embodiments, the hypotheses graph may be generated based on the list of hypotheses and scores thereof. Each node of the hypotheses graph may comprise a hypothesis of the list of hypotheses. In some exemplary embodiments, the hypotheses graph may be a directed graph with a preorder set in accordance with the scores of the hypotheses.

In some exemplary embodiments, the hypotheses graph may comprise parent nodes and child nodes. Each parent node may be connected by directed edges to one or more child nodes. Each parent node may represent an abstract Algorithm or a hypothesis. Each of the child nodes of a parent node may represent a different concretization of the abstract hypothesis represented by the parent node. In some exemplary embodiments, some child node may have child nodes thereof, connected thereto by directed edges. The child nodes of such child nodes, may represent an additional concretization to the concrete hypothesis represented by the child node. In some exemplary embodiments, the list of hypotheses may comprise the abstract hypothesis and the concretizations thereof. Additionally or alternatively, the list of hypotheses may comprise abstract hypotheses and concretization thereof may be obtained during the generation of the graph.

Additionally or alternatively, the hypotheses graph may be generated by applying a reinforcement learning algorithm that utilizes a sequence of previously generated hypotheses graphs.

On step 150, a selected hypothesis may be selected from the hypotheses graph. The selection may be performed based on a traversal of the hypotheses graph. The traversal of the hypotheses graph may be in accordance with the preorder thereof. Hypotheses with higher scores may be traversed first.

In some exemplary embodiments, the selection may comprise selecting a hypothesis that, when applied, improves the model-performance measurement of the classification task by a highest measurement compared to improvement gained by other hypotheses in the hypotheses graph. The selection may be performed after traversing the whole graph, a predetermined portion thereof, or the like. Additionally or alternatively, the selection may comprise selecting a first hypothesis encountered during the traversal of the hypotheses graph that an application thereof improves the model-performance measurement of the classification task by at least the predetermined target goal.

In some exemplary embodiments, in response to a traversal of a parent node, an abstract computation relating to the abstract hypothesis of the parent node may be performed. The abstract computation may comprise determining how an application of the hypothesis improves the model-performance measurement of the classification model. In response to traversing one of the child nodes, a concrete computation may be performed. The concrete computation may comprise determining how much an application of the specific concretization of the abstract hypothesis affects the model-performance measurement of the classification model. In some exemplary embodiments, the concrete computation may comprise executing the concrete hypothesis and determining the improvement in the model-performance measurement resulted from applying the hypothesis. In some exemplary embodiments, the scores of the hypotheses may be updated based on the abstract computation and the concrete computation.

The selected hypothesis may be selected based on the abstract computation and the concrete computation. It may be noted that in some cases the score of the abstract hypotheses and the scores of the concretizations thereof may not necessarily be correlated. A concrete hypothesis may be selected over other concrete hypotheses despite the abstract hypothesis associated therewith having a lower score. Additionally or alternatively, a best abstract hypothesis may be selected, and a best concretization thereof may be applied.

On Step 160, the selected hypothesis may be executed and the classification model and the model-performance measurement may be updated. In some exemplary embodiments, in case that the model-performance measurement is not improved by at least the predetermined target goal, Step 150 may be repeated.

Figure 2:
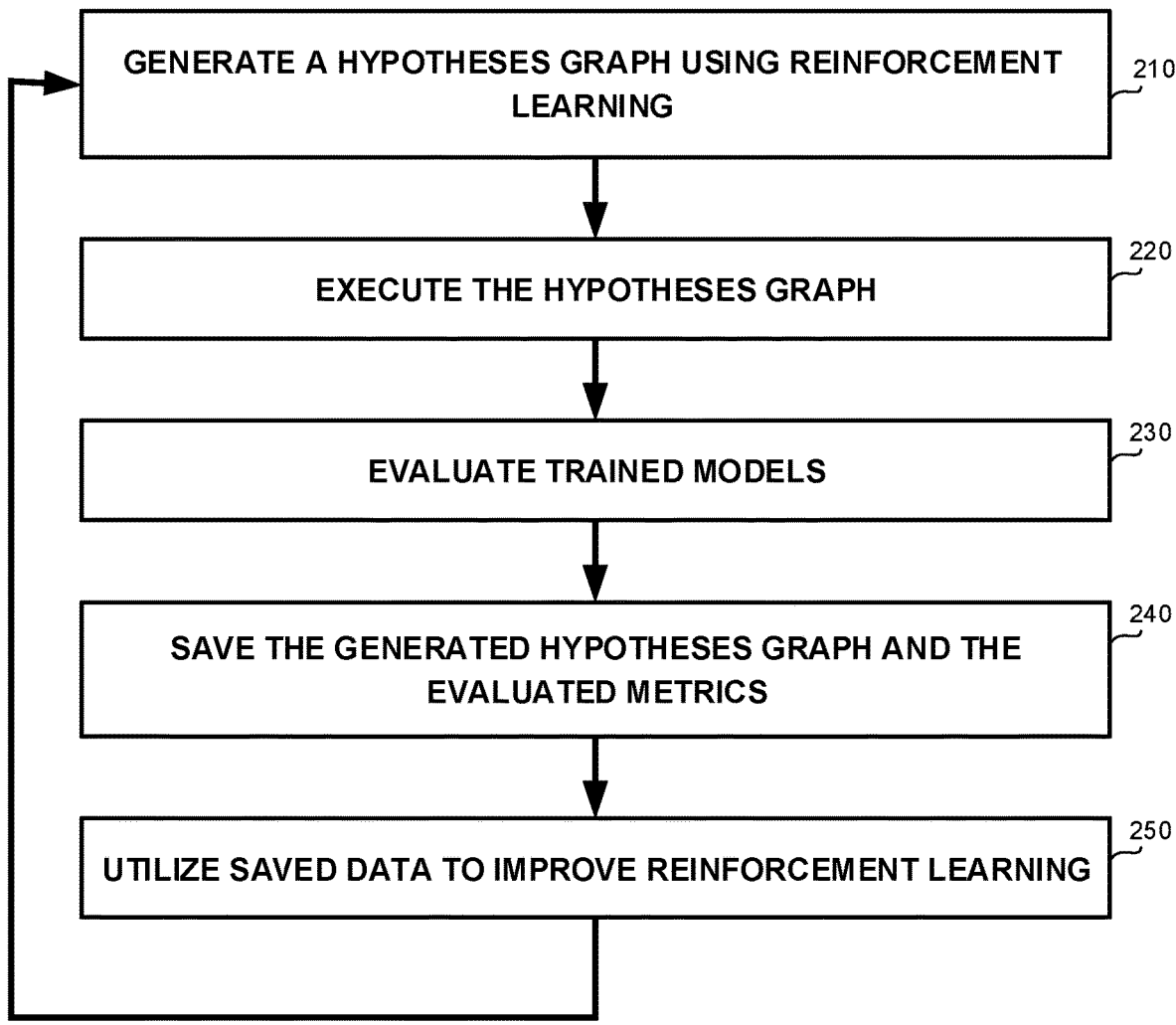
FIG. 2 shows a flowchart diagram of a method, in accordance with some exemplary embodiments of the disclosed subject matter.

Referring now to FIG. 2 showing a flowchart diagram of a method, in accordance with some exemplary embodiments of the disclosed subject matter.

On Step 210, a hypotheses graph may be generated using reinforcement learning. In some exemplary embodiments, the graph generation process may be an algorithmic learnable process performed based on previously generated hypotheses graphs. A reinforcement learning algorithm may be utilized to generate the hypotheses graph based on a sequence of previously generated hypotheses graphs. As an example, the reinforcement learning algorithm may be sequence-based memory algorithm, such as a Recursive NN, an LSTM, or the like, that can remember and recognize a sequence of inputs (such graphs of hypotheses and scores thereof) and generate as an output a new sequence that may be utilized. The sequence input may comprise a sequence of previously generated hypotheses graphs. Each hypotheses graph may be labeled with a score metric indicating whether the hypotheses graph improved the associated classification model, and which hypothesis was applied. The reinforcement learning algorithm may be configured to generate a hypotheses graph with a best score metric based on the sequence input.

Additionally or alternatively, the reinforcement learning may be applied while determining the list of hypotheses. A reinforcement learning algorithm that utilizes a previous set of hypotheses associated with the supervised classification task may be applied.

On Step 220, the hypotheses graph may be executed. In some exemplary embodiments, the hypotheses graph may be traversed. An application of the hypothesis in each node of the graph may be fully or partially simulated on the classification model in order to determine the potential improvement of the model-performance measurement of the classification model in response to applying the hypothesis thereon. A hypothesis may be selected similar to Step 150 of FIG. 1.

On Step 230, the selected hypothesis may be executed and a trained model may be evaluated. An evaluated metric representing the improvement of the accuracy of the classification model as a result of applying the associated hypothesis from the hypotheses graph. An evaluated metric may indicate which hypothesis was applied.

On Step 240, the generated hypotheses graph and the evaluated metrics may be saved. In some exemplary embodiments, the generated hypotheses graph and the evaluated metrics may be saved in an internal database of goal graphs associated with the server performing the self-motivated learning for the classification model. The evaluated trained models may be saved in an associated trained model database for future learning.

On Step 250, the saved data may be utilized to improve the reinforcement learning. In some exemplary embodiments, the reinforcement learning algorithm may be configured to improve its solution based on past decisions thereof. The reinforcement learning algorithm may be configured to utilize the evaluated model and metric of each hypothesis to apply a positive or a reward-based reinforcement. In positive reinforcement, when an event, such as an improvement of the accuracy, occurs due to a particular behavior, such as a particular hypothesis or feature thereof, increases the strength and the frequency of the behavior, e.g., the hypothesis of the feature thereof the that caused the improvement.

Figure 3:
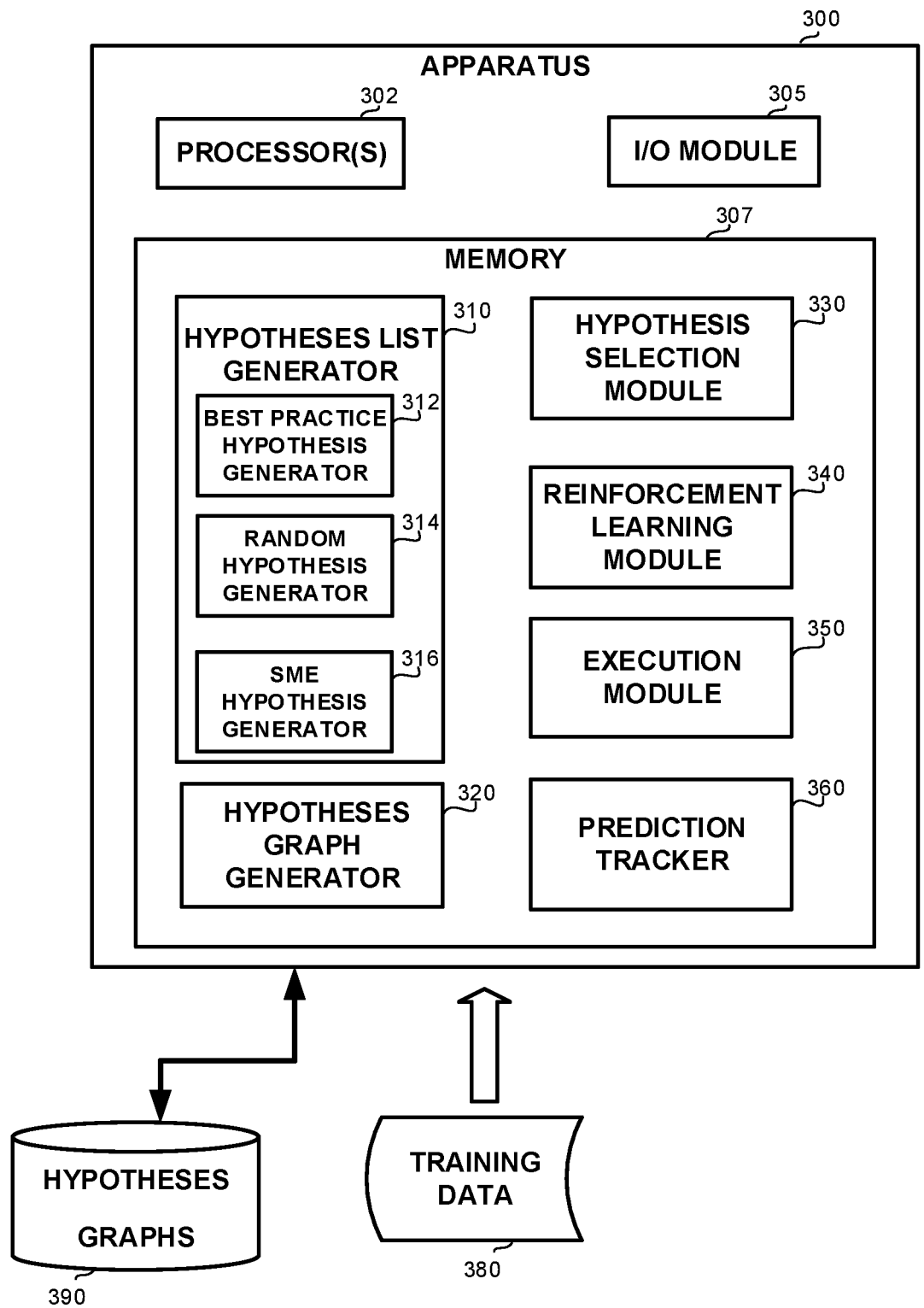
FIG. 3 shows a block diagram of an apparatus, in accordance with some exemplary embodiments of the disclosed subject matter.

Referring now to FIG. 3 showing a block diagram of an apparatus, in accordance with some exemplary embodiments of the disclosed subject matter. An Apparatus 300 may be configured to support an active machinery for performing self-motivated learning, inferencing, data-cleansing, novelty-detection, or the like, in accordance with the disclosed subject matter.

In some exemplary embodiments, Apparatus 300 may comprise one or more Processor(s) 302. Processor 302 may be a GPU, a TensorCore, a CPU, a microprocessor, an electronic circuit, an Integrated Circuit (IC), or the like. Processor 302 may be utilized to perform computations required by Apparatus 300 or any of its subcomponents.

In some exemplary embodiments of the disclosed subject matter, Apparatus 300 may comprise an Input/Output (I/O) module 305. I/O Module 305 may be utilized to provide an output to and receive input from a user, such as, for example obtaining instructions, training data, labeling functions, outputting hypotheses graphs, or the like.

In some exemplary embodiments, Apparatus 300 may comprise Memory 307. Memory 307 may be a hard disk drive, a Flash disk, a Random Access Memory (RAM), a memory chip, or the like. In some exemplary embodiments, Memory 307 may retain program code operative to cause Processor 302 to perform acts associated with any of the subcomponents of Apparatus 300.

In some exemplary embodiments, Apparatus 300 may be configured to monitor a classification model and autonomously improving the accuracy thereof, without relying on outside computing and databases. I/O Module 305 may be utilized to obtain an instruction to improve a classification model utilized for a supervised image classification task. The instruction may be obtained from a user, from a manufacturing machine server, or the like. Apparatus 300 may be configured to iteratively improving an model-performance measurement of the classification model, such as an accuracy measurement of the classification model, or the like.

In some exemplary embodiments, Hypotheses List Generator 310 may be configured to generate lists of hypotheses. Each hypothesis of the list of hypotheses relates to a strategy to potentially improve the classification model. Each hypothesis may be associated with a score indicating a likelihood that an application of the hypothesis improves the accuracy measurement of the classification model. The score may be computed by Hypotheses List Generator 310 or a component thereof.

In some exemplary embodiments, Hypotheses List Generator 310 may be configured to utilize a hypothesis generator such as 312-316 to generate the list of hypotheses. Each generated hypothesis may relate to a modification of the classification model, such as a model type thereof, a parameter related to the training data thereof, a modeling parameter, a parameter related to the supervised image classification task, or the like.

In some exemplary embodiments, Hypotheses List Generator 310 may be configured to apply Best Practice Hypothesis Generator 312 to generate one or more hypotheses of the hypotheses list. Best Practice Hypothesis Generator 312 may be configured to generate predefined best practice hypotheses that are configured to improve the classification model. The predefined best practice hypotheses may be generally proved to improve classification models, and may not directly relate to the specific classification task of the classification model. As an example, predefined best practice hypothesis may be retraining the classification model with additional training data.

Additionally or alternatively, Hypotheses List Generator 310 may be configured to apply SME Hypothesis Generator 316 to generate one or more hypotheses of the hypotheses list. SME Hypothesis Generator 316 may be a computer program product designed and developed by a SME to generate hypotheses based on one or more parameters of the supervised image classification task. SME Hypothesis Generator 316 may be developed by a user of the classification model, may be developed based on an input from the user, such as based on parameters of the supervised image classification task, based on parameters of the product being inspected, or the like. SME Hypothesis Generator 316 may be configured to generate hypotheses based on a number of classes of the supervised image classification task, a number of images in each class of the supervised image classification task, an image size in the supervised image classification task, a noisy label estimation measurement of the supervised image classification task, or the like.

Additionally or alternatively, Hypotheses List Generator 310 may be configured to apply a Random Hypothesis Generator 314 to generate one or more hypotheses of the hypotheses list. Random Hypothesis Generator 314 may be configured to generate random hypotheses. The random hypotheses may be an exploration mechanism for improving the classification model. Random Hypothesis Generator 314 may be configured to randomly select or generate hypotheses, with reference to an estimated probability of the score thereof.

In some exemplary embodiments, random hypotheses generated by Random Hypothesis Generator 314 may be determined as SME hypotheses based on execution results thereof by Execution Module 350. Such hypotheses may be utilized by SME Hypothesis Generator 316 in successive iterations.

In some exemplary embodiments, Hypotheses Graph Generator 320 may be configured to generate graphs of hypotheses based on the list of hypotheses generated by Hypotheses List Generator 310. Hypotheses Graph Generator 320 may be configured to generate each graph based on the scores of the hypotheses in the associated list of hypotheses.

In some exemplary embodiments, Hypotheses Graph Generator 320 may be configured to utilize Reinforcement Learning Module 340 to generate a hypotheses graph. Reinforcement Learning Module 340 may be configured to learn and determine what is the predicted method to automatically generate a graph of probable hypotheses to be tested for the classification model. Reinforcement Learning Module 340 may be configured to train Hypotheses Graph Generator 320 with previously generated hypotheses graphs to generate a new hypotheses graph. Reinforcement Learning Module 340 may be configured to utilize a sequence of previously generated hypotheses graphs to generate the hypotheses graph as a label for such sequence. Reinforcement Learning Module 340 may be configured to train Hypotheses Graph Generator 320 to generate a graph to be executed given an input classification task. Additionally or alternatively, Reinforcement Learning Module 340 may be utilized by Hypotheses List Generator 310 to determine a list of hypotheses based on a previous set of hypotheses associated with the supervised classification task.

In some exemplary embodiments, graphs generated by Hypotheses Graph Generator 320 and evaluated metrics associated therewith, such as improvement likelihoods, improved classification models, or the like, may be stored in Hypotheses Graphs Database 390. Data stored in Hypotheses Graphs Database 390 may be utilized in next iterations of improvements, in generating graphs for other classification models, updating an existing model, or the like.

In some exemplary embodiments, Hypothesis Selection Module 330 may be configured to select a selected hypothesis from the hypotheses graph generated by Hypotheses Graph Generator 320. Hypothesis Selection Module 330 may be configured to traverse the hypotheses graph and select a hypothesis that, when applied, improves the accuracy measurement of the classification task by a highest measurement compared to improvement gained by other hypotheses in the hypotheses graph. Additionally or alternatively, Hypothesis Selection Module 330 may be configured to traverse the hypotheses graph and select the first hypothesis encountered during the traversal of the hypotheses graph that an application thereof improves the accuracy measurement of the classification task by at least the predetermined target goal.

In some exemplary embodiments, Execution Module 350 may be configured to execute the selected hypothesis to update the classification model and improving the accuracy measurement by at least the predetermined target goal. In some exemplary embodiments, Execution Module 350 may be configured to utilize additional data in order to execute the hypothesis, such as additional training data obtained from Training Data 380, additional SME data from human experts, retagging images by users, modifying values of hyper-parameters, modifying the learning algorithm, or the like.

In some exemplary embodiments, Reinforcement Learning Module 340 may be configured to update the reinforcement learning algorithm utilized to generate the hypotheses graphs based on the results of executing the selected hypothesis. Reinforcement Learning Module 340 may be configured to improve the reinforcement learning algorithm based on the selected hypothesis, the improved classification model, the improvement in the accuracy, or the like.

In some exemplary embodiments, Apparatus 300 may comprise Prediction Tracker 360 that may be configured to monitor and regulate the prediction quantitative performance. Prediction Tracker 360 may be configured to analyze the instruction to keep track of the prediction performance of a classification model, to track and detect a probable mismatch between the data distribution of the incoming images to be classified as regarding to the data distribution of the images in the training phase, to track the reinforcement learning, to regulate the performance of the reinforcement learning, to validate that the predetermined target goal for improving the accuracy is achieved, or the like.

Figure 4:
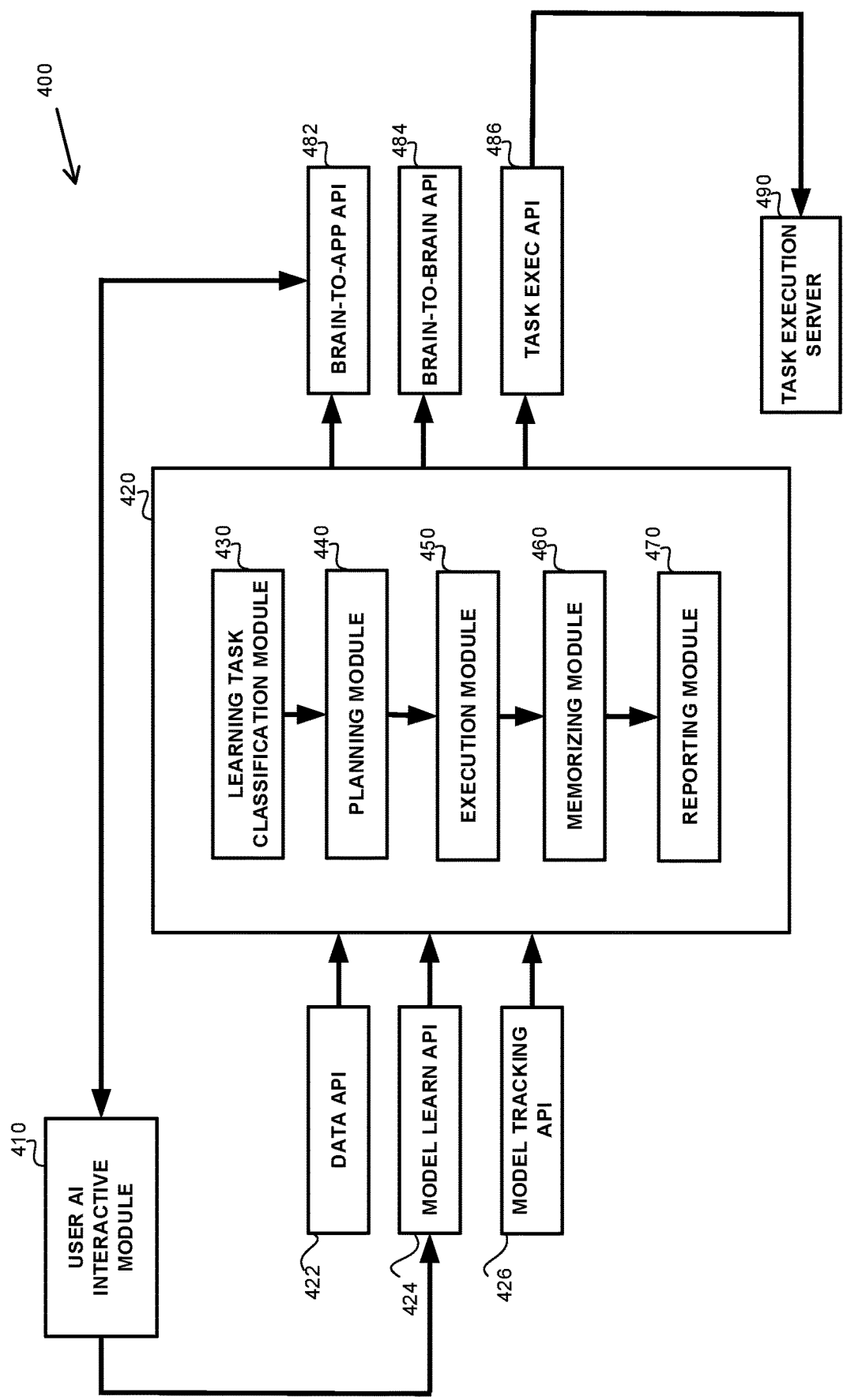
FIG. 4 shows a schematic illustration of an exemplary architecture, in accordance with some exemplary embodiments of the disclosed subject matter.

Referring now to FIG. 4 showing a schematic illustration of an exemplary architecture in which the disclosed subject matter may be utilized, in accordance with some exemplary embodiments of the disclosed subject matter.

In some exemplary embodiments, AI System 400 may be configured to automatically perform self-motivated improvement of a classification model. The classification model may be utilized for a supervised image classification task. As an example, AI System 400 may be associated with an inspection system aimed for classification of items, identification of defects in products, inspecting quality of products, or the like. The classification model may be utilized to classify images of the items or the products, detecting anomalies therein, detecting defects in the products, or the like. The self-motivation improvement mechanism may be driven by previously-set goals, such as goals set by the manufacture utilizing AI System 400, goals defined based on the desired quality of the products, goals defined based on the required final accuracy of the classification model, or the like.

In some exemplary embodiments, AI System 400 may be configured to employ a Brain Module 420 for performing the improvement of the classification model. A User AI Interactive Module 410 may be configured to issue an instruction to Brain 420 via a Model Learn Application Programing Interface (API) 424, to improve the classification model. Brain 420 may be configured to iteratively improve an accuracy measurement of the classification model by at least a predetermined target goal in each iteration. Brain 420 may be configured to obtain additional data for the improvement from external resources via Data API 422. The additional data may comprise training data, values of hyper-parameters, labeling functions, an improvement target goal, or the like.

In some exemplary embodiments, a Classification Module 430 of Brain 420 may be configured to analyze the learning instruction and classify the learning task of the classification model. Classification Module 430 may be configured to analyze the type of the learning task, an AI technique the classification model employs to perform the classification task, parameters of the classification model, parameters of the classification task, or the like. In some exemplary embodiments, Classification Module 430 may classify the learning task such as based on the number of labeling/classes, number of instances in each class in the training set, a size of input, an aspect ratio of an image input, noisy label estimation measurement, and parameters related thereto, properties of instances of different classes, or the like.

In some exemplary embodiments, a Planning Module 440 of Brain 420 may be configured to generate an execution-plan for a hypotheses graph for improving the classification model based on the classification determined by Classification Module 430. Each node of the hypotheses graph may comprise a hypothesis relating to a strategy to potentially improve the classification model. In some exemplary embodiments, Planning Module 440 may be configured to implement reinforcement learning regarding the hypotheses execution to improve the self-motivated learning. Planning Module 440 may be configured to perform reinforcement learning to determine which hypotheses to be applied, an order of application between hypotheses, or the like. Planning Module 440 may utilize reinforcement learning to predict a useful hypotheses graph based on a sequence of previously generated hypotheses graphs of the same learning task, based on the classification of the learning task, based on predicted scores of the different hypotheses, or the like.

Additionally or alternatively, Planning Module 440 may be configured to employ other machine learning techniques to generate the execution-plan of the hypotheses graph, such as using Automated Machine Learning (Auto ML), Deep Neural Network (DNN), Convolutional Neural Network (CNN), Transfer Learning, Clustering, Weak Learning, or the like.

An Execution Module 450 of Brain 420 may be configured to execute the hypothesis graph. Executing the hypothesis graph may comprise traversing the graph to iteratively select a hypothesis that is likely to improve the accuracy measurement of the classification model by at least the predetermined target goal and executing it, until the predetermined target goal is achieved. In each iteration, Execution Module 450 may be configured to select a hypothesis that, when applied, improves the accuracy measurement of the classification task by a highest measurement compared to improvement gained by other hypotheses in the hypotheses graph or portion thereof. Additionally or alternatively, in each iteration, Execution Module 450 may be configured to select a first hypothesis encountered during the traversal of the hypotheses graph that an application thereof improves the accuracy measurement of the classification task by at least the predetermined target goal. In some exemplary embodiments, each hypothesis that is executed may be executed on a standalone copy of the model, so as to obtain an updated model based on the application of the hypothesis. In some exemplary embodiments, performance of different alternative updated models, each of which is the outcome of executing a different hypothesis, may be compared to select the preferred hypothesis to be applied.

In some exemplary embodiments, Execution Module 450 may initially execute the hypotheses in a small scale, to determine their applicability. After a hypothesis is selected, the hypothesis may be executed in full to obtain the updated model.

Additionally or alternatively, Execution Module 450 may be configured to employ a Task Execution Server 490 via a Task Execution API 486 to externally execute the hypotheses graph. In some exemplary embodiments, Task Execution Server 490 may have large computational resources, such as by applying multiple GPUs, may be a distributed computational environment, a cloud computing service, or the like.

In some exemplary embodiments, in response to executing the hypotheses graph, an improved classification model with an accuracy measurement improved by at least the predetermined target goal, may be generated. In some cases, the generated hypothesis graph may not gain the desirable target and Planning Module 440 may be instructed to regenerate a new execution-plan hypotheses graph.

In some exemplary embodiments, a Memorizing Module 460 of Brain 420 may be configured to store the generated hypotheses graph and evaluated metrics associated therewith. In some exemplary embodiments, the generated hypotheses graph and the evaluated metrics may be saved in an internal database of hypotheses graphs associated AI System 400, in external databases, in databases associated with other AI systems, or the like. The generated hypotheses graph and the evaluated metrics may be utilized in future learning, such as to improve the reinforcement learning solution of Planning Module 440.

In some exemplary embodiments, a Reporting Module 470 of Brain 420 may be configured to report the result of executing the hypothesis graph to AI System 400, such as via Brain-to-App API 482. In some exemplary embodiments, User AI Interactive Module 410 may be configured to assess the report and determine whether or not to invoke an additional improvement iteration. In some exemplary embodiments, the report may indicate that the target goal was reached, and as a result, another iteration may be performed to further improve the model. Additionally or alternatively, the report may indicate that the target goal was not reached, and as a result, it may be determined that no additional iteration should be performed as there may be low likelihood (e.g., below a threshold) that an additional iteration would provide an improvement. Additionally or alternatively, in case the report indicates that the target goal was not reached, an additional iteration may be attempted, during which a different hypotheses graph may be generated, taking into account the failure of the previous hypotheses graph in providing the desired improvement.

In some exemplary embodiments, Brain 420 may be configured to communicate with other modules, similar to Brain 420, such as a brain module of other AI systems similar to Brain 420, other brain modules with the same type of Brain 420, or the like, via Brain-to-Brain API 484. Brain-to-Brain API 484 may be utilized to provide data for other AI systems for collaboration, distribution, or the like.

In some exemplary embodiments, a Model Tracking API 426 may be utilized to obtain performance information regarding a classification model. In some exemplary embodiments, the accuracy measurement of the classification model may be monitored and tracked. Information regarding the performance, such as accuracy measurements, number of applications of the classification model, instances on which the classification model was applied, or the like, may be provided to Brain 420 via Model Tracking API 426. In some exemplary embodiments, the model tracking may be performed with respect to the classification model, to one or more updated classification models, or the like. In some exemplary embodiments, such information may be utilized by Classification Module 430, by Planning Module 440, Memorizing Module 460, or the like.

Figure 5A:
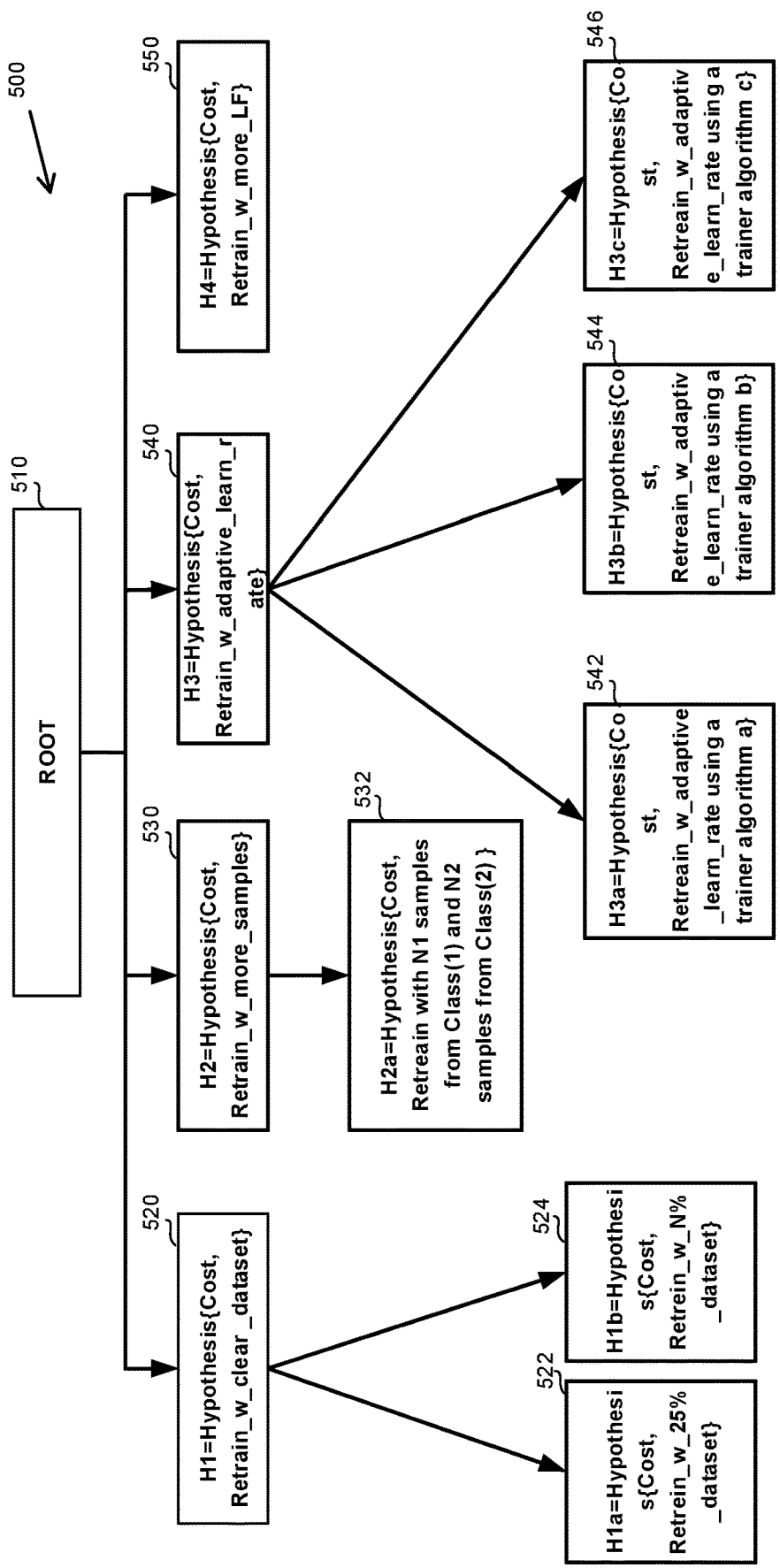
FIG. 5A shows an illustration of an exemplary hypotheses goal graph, in accordance with some exemplary embodiments of the disclosed subject matter.

Referring now to FIG. 5A showing an illustration of an exemplary hypotheses goal graph, in accordance with some exemplary embodiments of the disclosed subject matter.

Hypotheses Graph 500 may be an exemplary hypotheses goal graph generated in response to an instruction to improve a classification model utilized for a supervised image classification task. As an example, the classification model may be utilized for quality control of FPD products. Hypotheses Graph 500 may be utilized to improve an accuracy measurement of the classification model, such as an F1-score, by at least a predetermined target goal, such as 0.5%.

In some exemplary embodiments, nodes of Hypotheses Graph 500 may comprise hypotheses. Each hypothesis in Hypotheses Graph 500 may relate to a strategy to potentially improve the classification model, such as strategies related to retraining the classification model, modifying the model, or the like. In some exemplary embodiments, a leaf node may comprise a concrete hypothesis. Additionally or alternatively, an internal node may comprise an abstract hypothesis, the children of which may comprise concretizations of the abstract hypothesis. In some exemplary embodiments, a Root Node 510 may represent a degenerated hypothesis that represents the general notion of improving the classification model. Additionally or alternatively, Root Node 510 may not comprise any hypothesis. In some exemplary embodiments, Goal Graph 500 may comprise internal nodes, each of which is associated with one or more child nodes. Each internal, non-leaf, node may represent an abstract hypothesis indicating an abstract strategy for improving the classification model accuracy. Each child node may represent a different concretization of the abstract hypothesis of the associated internal node. The concretization may be related to parameters of the abstract hypothesis, such as assigning different values thereto. Additionally or alternatively, the concretization may be related to the manner of applying the hypothesis, sources of additional data, utilized algorithms, or the like. In some exemplary embodiments, the order between children nodes may impose a traversal order on the nodes, which may impose an order of application and execution of the different hypotheses.

In Goal Graph 500, Hypothesis H1 in Node 520 may indicate a strategy of retraining the classification model with a clear dataset. Hypothesis H1 a in Node 522 may be a concretization of Hypothesis H1. Hypothesis H1a may indicate a strategy of retraining the classification model with a dataset comprising 25% of the original dataset utilized to train the classification model. Hypothesis H1b in Node 524 may be a different concretization of Hypothesis H1. Hypothesis H1b may indicate a strategy of retraining the classification model with a dataset comprising N % of the original dataset utilized to train the classification model. N may be determined during the execution of Goal Graph 500.

Hypothesis H2 in Node 530 may indicate a strategy of retraining the classification model with more samples. Hypothesis H2a in Node 532 may be a concretization of Hypothesis H2. Hypothesis H2a may indicate a strategy of retraining the classification model that is configured to classify instances to an additional two classes, a first and a second classes with N1 labeled samples from a first class and N2 samples from a second class. In some exemplary embodiments, N1 and N2 may be determined during execution of H2a. Additionally or alternatively, N1 and N2 may be predetermined.

Hypothesis H3 in Node 540 may indicate a strategy of retraining the classification model with an adaptive learning rate. Hypothesis H3a in Node 542, Hypothesis H3b in Node 544 and Hypothesis H3c in Node 546 may be concretizations of Hypothesis H3. Hypothesis H3a may indicate retraining the classification model with an adaptive learning rate using a first training algorithm for the adaptive learn rate. Hypothesis H3b may indicate retraining the classification model with an adaptive learning rate using a second training algorithm for the adaptive learn rate. Hypothesis H3c may indicate retraining the classification model with an adaptive learning rate using a third training algorithm for the adaptive learn rate.

Hypothesis H4 in Node 550 may indicate a strategy of retraining the classification model to classify additional number of classes, defined using additional labeling functions. In some exemplary embodiments, the additional labeling functions may be obtained via a callback API. In some exemplary embodiments, the additional labeling functions may be provided by a human user, may be obtained from a repository, or the like.

Figure 5B:
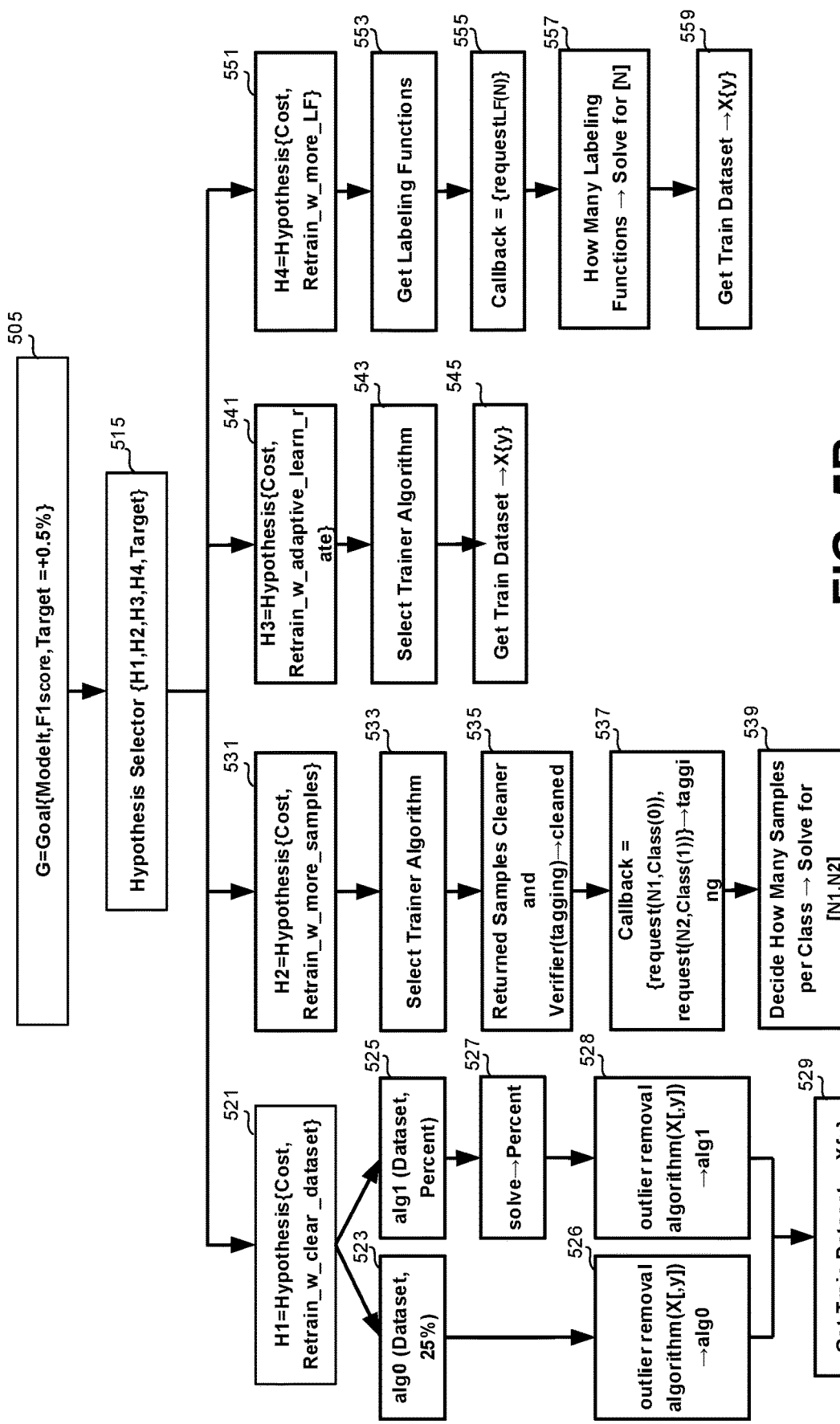
FIG. 5B shows an illustration of an execution of an exemplary hypotheses goal graph, in accordance with some exemplary embodiments of the disclosed subject matter.

Referring now to FIG. 5B showing an illustration of an execution of a hypotheses goal graph, in accordance with some exemplary embodiments of the disclosed subject matter.

A hypotheses graph, such as Hypotheses Graph 500, may be generated in response to an instruction to improve a classification model utilized for a supervised image classification task (505). As an example, the classification model may be utilized for quality control of FPD products. Hypotheses Graph 500 may be utilized to improve an accuracy measurement of the classification model, such as an F1-score, by at least a predetermined target goal, such as 0.5%.

In one exemplary embodiment, Goal Graph 500 may be automatically generated in order to improve the accuracy measurement of a given classification model by 0.5%., Goal Graph 500 may comprise different hypotheses, H1-H4, that are likely to improve the F1 score of the classification model by at least 0.5%.

In some exemplary embodiments, each hypothesis may be assigned a score and a cost. The score of a hypothesis may indicate a likelihood that an application of the hypothesis improves the accuracy measurement of the classification model by at least the target goal. In some cases, only hypotheses with a score above a predetermined threshold, such as about 90%, 95%, or the like, may be included in the hypotheses graph. The cost of a hypothesis may indicate the cost of applying the hypothesis on the classification model, such as the time required to apply and execute the hypothesis, the computational resources, or the like. In some exemplary embodiments, the hypotheses goal graph may be ordered in accordance with the score, the cost, a combination thereof, or the like. The ordering of the hypotheses graph may impose a traversal order thereof, such that hypotheses with higher scores may be traversed first. As a result, the order of the traversal may be H1, H1 a, H1b, H2, H2a, H3, H3 a, H3b, H3c and H4.

A hypothesis selector may be configured to execute Goal Graph 500 in order to select a hypothesis that improves the classification model by at least 0.5% (515). In some exemplary embodiments, the hypothesis selector may be configured to select a selected hypothesis based on a traversal of Hypotheses Graph 500. During the traversal, abstract computations relating to the abstract hypotheses may be performed when traversing parent nodes, and concrete computations may be performed when traversing child nodes. The abstract and the concrete computations may be utilized to determine updated scores of the hypotheses and selecting a hypothesis to be applied on the classification model. The selected hypothesis may be executed, the classification model may be updated and the accuracy measurement thereof may be improved by at least the predetermined target goal.

While traversing Node 520, abstract computations related to Hypothesis H1 may be performed (521). Hypothesis H1 may be an abstract hypothesis indicating a strategy of retraining the classification model with a clear dataset. Additional concrete computations may be performed while traversing Nodes 522 and 524. An algorithm for selecting 25% of the dataset as a cleaner set for the retraining may be applied (523). The algorithm may be configured to select the top 25% image-label accurate datum to be in the cleaner dataset. An outlier removal algorithm may be applied in order to enhance the algorithm of Hypothesis H1 a (526). An algorithm for selecting a predetermined percent of the dataset as a cleaner label-wise set for the retraining may be applied (525). The predetermined percent to be utilized in Hypothesis H1 may be determined (527). The determination may be performed based on the cost, based on the predetermined target goal, based on other parameters of the classification model, or the like. An outlier removal algorithm may be applied in order to enhance the training dataset (528). The training dataset for the retraining based on Hypothesis H1a or H1b may be determined (529).

While traversing Node 530, abstract computations related to Hypothesis H2 may be performed (531). Hypothesis H2 may be an abstract hypothesis indicating a strategy of retraining the classification model with more labeled samples.

While traversing Node 532, a trainer algorithm for the retraining with more samples of Hypothesis H2 may be applied (533). Hypothesis H2a may indicate a strategy of retraining the classification model that is configured to classify instances between first and second classes with N1 samples from a first class and N2 samples from a second class. In order to determine the numbers N1 and N2, Tagging of the samples may be verified and clear samples may be returned (535). A call back to request additional samples from different classes may be issued (537). The call back may be issued to an AI system, to a user of the goal graph, to an external source, or the like A decision of how many samples of each class (N1 and N2) to utilize may be performed (539).

While traversing Node 540, abstract computations related to Hypothesis H3 may be performed (541). Hypothesis H3 may be an abstract hypothesis indicating a strategy of retraining the classification model with an adaptive learning rate. While traversing Nodes 542, 544 and 546, concrete computations may be performed to evaluate Hypothesis H3a, Hypothesis H3b and Hypothesis H3c (543, 545). A training algorithm for Hypothesis H3a, Hypothesis H3b and Hypothesis H3c (traversed on 543), may be selected as a first, a second or a third training algorithm for the adaptive learn rate, respectively. A respective training dataset may be obtained (545).

While traversing Node 550, abstract computations related to Hypothesis H4 may be performed (551). Hypothesis H4 may be an abstract hypothesis indicating a strategy of retraining the classification model to classify additional number of classes, defined using additional labeling functions. Labeling functions for the additional classes to be used in Hypothesis H4, may be obtained (533). In some exemplary embodiments, the additional labeling functions may be provided by a human user, may be obtained from a repository, or the like (553). In some exemplary embodiments, the additional labeling functions may be obtained via a callback API (555). The call back request may be addressed to a user, to an external database, or the like. The number of labeling functions to request may be determined (557). The training dataset for the retraining based on Hypothesis H4 may be obtained (559).

In some exemplary embodiments, the traversal of Goal Graph 500 may be terminated when a hypothesis is selected. In some exemplary embodiments, the hypothesis with highest improvement over the accuracy measurement of the classification task by compared to improvement gained by other hypotheses in Goal Graph 500 may be selected. In such case, Goal Graph 500 may be entirely traversed. Additionally or alternatively, a first hypothesis encountered during the traversal of the Goal Graph 500 that an application thereof improves the accuracy measurement of the classification task by at least the predetermined target goal, may be selected.

Figure 6:
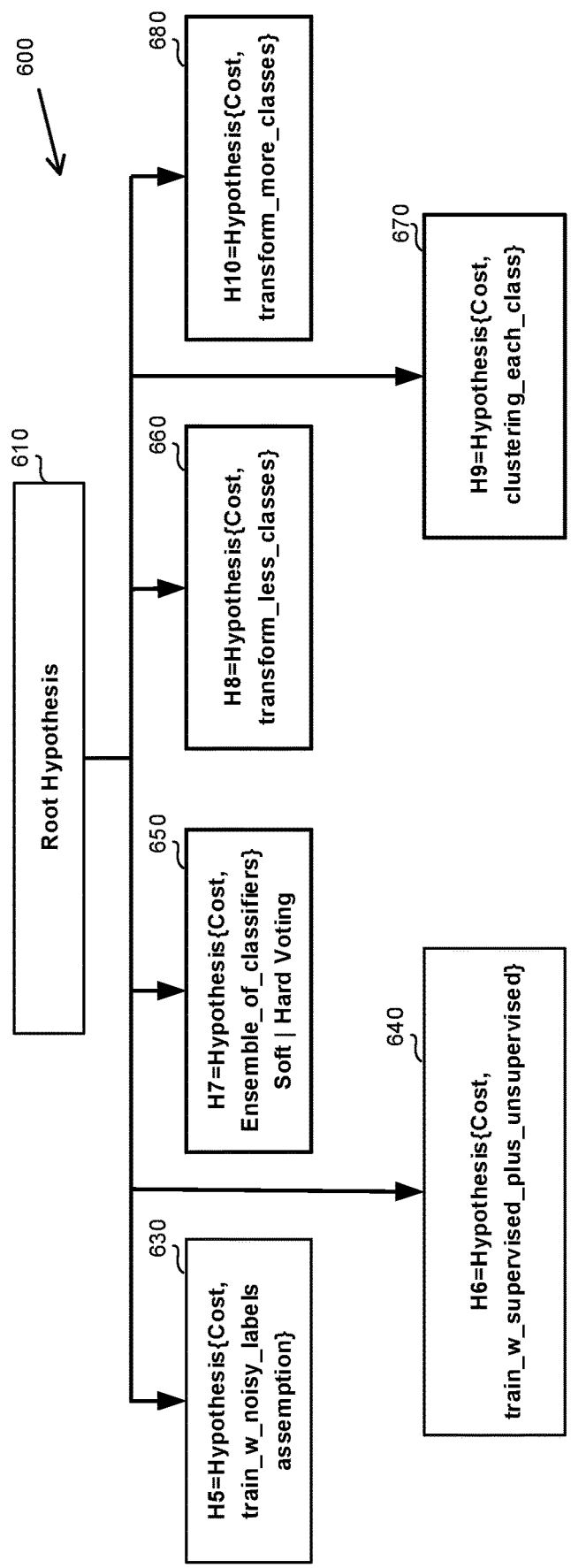
FIG. 6 shows an illustration of a hypotheses goal graph, in accordance with some exemplary embodiments of the disclosed subject matter.

Referring now to FIG. 6 showing an illustration of an exemplary hypotheses goal graph, in accordance with some exemplary embodiments of the disclosed subject matter.

Hypotheses Graph 600 may be an exemplary hypotheses goal graph generated in response to an instruction to improve a classification model utilized for a supervised image classification task. Nodes 630-680 of Hypotheses Graph 500 600 may comprise hypotheses relating to strategies to potentially improve the classification model, such as strategies related to a model type of the classification model, strategies related to a training parameter of the classification model, strategies related to a modeling parameter of the classification model, strategies related to a modeling of the supervised image classification task, strategies related to a training set utilizes to train the classification model, strategies related to a validation set utilized to validate the classification model, strategies related to a test set utilized to test the classification model, or the like. In some exemplary embodiments, a Root Hypothesis Node 610 may represent a degenerated hypothesis that represents the general notion of improving the classification model. Additionally or alternatively, Root Hypothesis Node 610 may not comprise any hypothesis.

Node 630 comprises an abstract Hypothesis H5 for improving the classification model. Hypothesis H5 may be related to a strategy of training of the classification model. Hypothesis H5 suggests training with noisy labels assumption. According to Hypothesis H5, the training may be performed while K % of the labels of the samples are assumed to be wrong. Parameter K may be determined during the execution of Hypotheses Graph 600, by a user, based on the classification task requirement, or the like. As an example, parameter K may be 10, 20, 30, or the like.

Node 640 comprises an abstract Hypothesis H6 for improving the classification model. Hypothesis H6 may be related to a strategy related to a training parameter of the classification model, such as what type of training. Hypothesis H6 suggests utilizing mixed supervised and unsupervised training. A determination whether training with tagged images and a large set of untagged images can provide a better classification model, may be performed. It may be appreciated that several concretizations may be performed on abstract Hypothesis H6 in order to evaluate the likelihood of improving the accuracy measurement thereby, such as the amount of untagged images to be utilized in the training, what percent of unsupervised learning to be performed, or the like.

Node 650 comprises an abstract Hypothesis H7 for improving the classification model. Hypothesis H7 may be related to a strategy related to a model type of the classification model. Hypothesis H7 suggests utilizing an ensemble of classifiers to perform the classification task. The tested hypothesis may be whether multiple-judges voting on each sample can provide more stable results against outliers, novelty, anomaly, or the like.

Node 660 comprises an abstract Hypothesis H8 for improving the classification model. Hypothesis H8 may be related to a strategy related to a modeling parameter of the classification model. Hypothesis H8 suggests clustering some classes in the supervised image classification task into several sub-classes. The tested hypothesis may be whether sub-patterns inside the classification categories that the user have selected can be found.

Node 670 comprises an abstract Hypothesis H9 for improving the classification model. Hypothesis H9 may be related to a strategy related to a modeling of the supervised image classification task. Hypothesis H9 suggests utilizing a lower number of classes. The tested hypothesis may be whether unifying set of classes can get better classification results. In this hypothesis, multiple solutions can be proposed to the user to decide thereupon. Hypothesis H9 may transform the original learning task into another related learning task, with a slight difference in its formal definition.

Node 680 comprises an abstract Hypothesis H10 for improving the classification model. Hypothesis H10 may be related to a strategy related to a modeling of the supervised image classification task. Hypothesis H10 suggests utilizing a greater number of classes. The tested hypothesis may be whether unifying more classes can provide better confusion matrix results.

The present invention may be a system, a method, or a computer program product. The computer program product may include a computer readable storage medium having instructions thereon for causing a processor to carry out aspects of the present invention.

The computer readable storage medium can be a tangible device that can retain and store instructions for use by an instruction execution device. The computer readable storage medium may be, for example, but is not limited to, electronic, magnetic optical storage, or the like, such as but not limited to a hard disk, a random access memory (RAM), a read-only memory (ROM), an erasable programmable read-only memory (EPROM or Flash memory), or the like. In some cases, the instructions may be downloadable to the storage medium from a server, a remote computer, a remote storage, or the like.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart and block diagrams of methods, apparatus, systems, and computer program products. It will be understood that each block in the diagrams, and combinations of blocks in the diagrams, can be implemented by computer readable program instructions.

The computer readable program instructions may be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions specified in the block of the diagrams.

The flowchart and block diagrams in the figures illustrate possible implementations of various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the diagrams and combinations of blocks can be implemented by special purpose hardware-based systems.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   obtaining an instruction to improve a classification model, wherein the classification model is utilized for a supervised image classification task;
   in response to said obtaining, iteratively improving a model-performance measurement of the classification model, wherein in each iteration of the model-performance measurement of the classification model is improved by at least a predetermined target goal, wherein said iteratively improving comprises:
      determining a list of hypotheses, wherein each hypothesis of the list of hypotheses relates to a strategy to potentially improve the classification model, wherein for each hypothesis a score is determined, wherein the score indicates a likelihood that an application of the hypothesis improves the model-performance measurement of the classification model;
      generating, based on the list of hypotheses and the scores thereof, a hypotheses graph for improving the classification model, wherein each node of the hypotheses graph comprises a hypothesis of the list of hypotheses, and wherein said generating the hypotheses graph comprises applying a reinforcement learning algorithm that utilizes a sequence of previously generated hypotheses graphs;
      selecting a selected hypothesis from the hypotheses graph, wherein said selecting is based on a traversal of the hypotheses graph;
      executing the selected hypothesis thereby updating the classification model and improving the model-performance measurement by at least the predetermined target goal; and
      updating the reinforcement learning algorithm based on said executing.

2. The method of claim 1, wherein each hypothesis of the list of hypotheses relates to a modification of at least one of:
   a model type of the classification model,
   a training parameter of the classification model,
   a modeling parameter of the classification model,
   a modeling of the supervised image classification task,
   a training set utilized to train the classification model,
   a validation set utilized to validate the classification model, or
   a test set utilized to test the classification model.

3. The method of claim 2, wherein the hypotheses graph comprises at least one hypothesis that is not related to the model type of the classification model.

4. The method of claim 1, wherein the determining the list of hypotheses comprises:
   applying a predefined best practice hypothesis generator, and
   applying a random hypothesis generator.

5. The method of claim 1, wherein the determining the list of hypotheses comprises applying a Subject Matter Expert (SME) hypothesis generator, wherein the SME hypothesis generator is a computer program product designed by a SME to generate hypotheses based on one or more parameters of the supervised image classification task.

6. The method of claim 1, wherein said determining the list of hypotheses is performed based on at least one of: a number of classes of the supervised image classification task, a number of images in each class of the supervised image classification task, an image size in the supervised image classification task, or a noisy label estimation measurement of the supervised image classification task.

7. The method of claim 1, wherein said selecting the selected hypothesis comprises selecting a hypothesis that, when applied, improves the model-performance measurement of the classification task by a highest measurement compared to improvement gained by other hypotheses in the hypotheses graph.

8. The method of claim 1, wherein said selecting the selected hypothesis comprises selecting a first hypothesis encountered during the traversal of the hypotheses graph that an application thereof improves the model-performance measurement of the classification task by at least the predetermined target goal.

9. The method of claim 1, wherein said determining the list of hypotheses is performed based on a previous set of hypotheses associated with the supervised classification task.

10. The method of claim 9, wherein said determining the list of hypotheses comprises applying the reinforcement learning algorithm, wherein the reinforcement learning algorithm utilizes the previous set of hypotheses.

11. The method of claim 1, wherein the hypotheses graph comprises a parent node that is connected by one or more directed edges to one or more child nodes, respectively, wherein the parent node represents an abstract hypothesis, wherein each of the one or more child nodes represents a different concretization of the abstract hypothesis, wherein said selecting the selected hypothesis from the hypotheses graph comprises:
  in response to a traversal of the parent node, performing an abstract computation relating to the abstract hypothesis; and
  in response to traversing one of the one or more child nodes, performing a concrete computation;
  wherein the selected hypothesis is selected based on the abstract computation and the concrete computation.

12. An Artificial Intelligence (AI) system comprising:
  a classification model improvement module configured to obtain an instruction to improve a classification model, wherein the classification model is utilized for a supervised image classification task;
  wherein the classification model improvement module is configured to iteratively improve a model-performance measurement of the classification model, wherein in each iteration the model-performance measurement of the classification model is improved by at least a predetermined target goal, wherein the classification model improvement module comprises:
    a planning module configured to:
      determine a list of hypotheses, wherein each hypothesis of the list of hypotheses relates to a strategy to potentially improve the classification model, wherein for each hypothesis a score is determined, wherein the score of a hypothesis indicates a likelihood that an application of the hypothesis improves the model-performance measurement of the classification model;
      generate, based on the list of hypotheses and scores thereof, a hypotheses graph for improving the classification model, wherein each node of the hypotheses graph comprises a hypothesis of the list of hypotheses, and wherein generating the hypotheses graph includes applying a reinforcement learning algorithm that utilizes a sequence of previously generated hypotheses graphs;
      select a selected hypothesis from the hypotheses graph, wherein said selecting is based on a traversal of the hypotheses graph;
      and
    an execution module configured to execute the selected hypothesis, thereby updating the classification model and improving the model-performance measurement by at least the predetermined target goal; and
    wherein said planning module is further configured to update the reinforcement learning algorithm based on execution results of said execution module.

13. The AI system of claim 12, wherein said planning module is configured to:
  apply a predefined best practice hypothesis generator to generate at least one hypothesis of the hypotheses list;
  apply a random hypothesis generator to generate at least one hypothesis of the hypotheses list; and
  apply a Subject Matter Expert (SME) hypothesis generator to generate at least one hypothesis of the hypotheses list, wherein the SME hypothesis generator is a computer program product designed by a SME to generate hypotheses based on one or more parameters of the supervised image classification task.

14. The AI system of claim 12, wherein said planning module is configured to determine the list of hypotheses based on a previous set of hypotheses associated with the supervised classification task.

15. The AI system of claim 14, wherein said planning module is configured to determine the list of hypotheses by applying the reinforcement learning algorithm, wherein the reinforcement learning algorithm utilizes the previous set of hypotheses.

16. The AI system of claim 12, wherein the hypotheses graph comprises a parent node that is connected by one or more directed edges to one or more child nodes, respectively, wherein the parent node represents an abstract hypothesis, wherein each of the one or more child nodes represents a different concretization of the abstract hypothesis, wherein said planning module is configured to:
  in response to a traversal of the parent node, perform an abstract computation relating to the abstract hypothesis; and
  in response to traversing one of the one or more child nodes, perform a concrete computation;
  wherein the selected hypothesis is selected based on the abstract computation and the concrete computation.

17. A computerized apparatus having a processor, the processor being adapted to perform the steps of:
  obtaining an instruction to improve a classification model, wherein the classification model is utilized for a supervised image classification task;
  in response to said obtaining, iteratively improving a model-performance measurement of the classification model, wherein in each iteration the model-performance measurement of the classification model is improved by at least a predetermined target goal, wherein said iteratively improving comprises:
    determining a list of hypotheses, wherein each hypothesis of the list of hypotheses relates to a strategy to potentially improve the classification model, wherein for each hypothesis a score is determined, wherein the score of a hypothesis indicates a likelihood that an application of the hypothesis improves the model-performance measurement of the classification model;

generating, based on the list of hypotheses and scores thereof, a hypotheses graph for improving the classification model, wherein each node of the hypotheses graph comprises a hypothesis of the list of hypotheses, and wherein said generating the hypotheses graph comprises applying a reinforcement learning algorithm that utilizes a sequence of previously generated hypotheses graphs;

selecting a selected hypothesis from the hypotheses graph, wherein said selecting is based on a traversal of the hypotheses graph;

executing the selected hypothesis thereby updating the classification model and improving the model-performance measurement by at least the predetermined target goal; and updating the reinforcement learning algorithm based on said executing.

18. A computer program product comprising a non-transitory computer readable storage medium retaining program instructions, which program instructions when read by a processor, cause the processor to perform a method comprising:

obtaining an instruction to improve a classification model, wherein the classification model is utilized for a supervised image classification task;

in response to said obtaining, iteratively improving a model-performance measurement of the classification model, wherein in each iteration the model-performance measurement of the classification model is improved by at least a predetermined target goal, wherein said iteratively improving comprises:

determining a list of hypotheses, wherein each hypothesis of the list of hypotheses relates to a strategy to potentially improve the classification model, wherein for each hypothesis a score is determined, wherein the score of a hypothesis indicates a likelihood that an application of the hypothesis improves the model-performance measurement of the classification model;

generating, based on the list of hypotheses and scores thereof, a hypotheses graph for improving the classification model, wherein each node of the hypotheses graph comprises a hypothesis of the list of hypotheses, wherein said generating the hypotheses graph comprises applying a reinforcement learning algorithm that utilizes a sequence of previously generated hypotheses graphs;

selecting a selected hypothesis from the hypotheses graph, wherein said selecting is based on a traversal of the hypotheses graph;

executing the selected hypothesis thereby updating the classification model and improving the model-performance measurement by at least the predetermined target goal; and updating the reinforcement learning algorithm based on said executing.

* * * * *